(12) United States Patent
Fukazawa et al.

(10) Patent No.: US 9,180,682 B2
(45) Date of Patent: Nov. 10, 2015

(54) PRINTING APPARATUS, PRINTING SYSTEM, AND PRINTING METHOD

(71) Applicant: Seiko Epson Corporation, Tokyo (JP)

(72) Inventors: Masahiro Fukazawa, Chino (JP); Naoki Sudo, Shiojiri (JP); Akito Sato, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/680,338

(22) Filed: Apr. 7, 2015

(65) Prior Publication Data
US 2015/0283822 A1    Oct. 8, 2015

(30) Foreign Application Priority Data
Apr. 8, 2014    (JP) .................. 2014-079148

(51) Int. Cl.
*B41J 2/21*    (2006.01)
*B41J 2/045*   (2006.01)

(52) U.S. Cl.
CPC ............. *B41J 2/2132* (2013.01); *B41J 2/045* (2013.01)

(58) Field of Classification Search
CPC .... B41J 2/2139; B41J 2/2142; B41J 2/04596; B41J 29/38; B41J 29/393; H04N 1/405
USPC .............. 347/9–12, 14–15, 19, 40–43, 78, 81
See application file for complete search history.

(56) References Cited

U.S. PATENT DOCUMENTS 9,064,327 B2 *    6/2015    Shibata .................................. 1/1

FOREIGN PATENT DOCUMENTS

JP    2001-150685 A    6/2001
JP    2013-126776 A    6/2013

* cited by examiner

*Primary Examiner* — Thinh Nguyen
(74) *Attorney, Agent, or Firm* — Harness, Dickey & Pierce, P.L.C.

(57) ABSTRACT

A printing apparatus includes a printing head that includes a nozzle array, and a discharging control unit. The nozzle array is divided into a plurality of nozzle groups that is configured by a predetermined number of nozzles. The discharge control unit, when an abnormal nozzle having abnormal function of discharging the ink is included in any of the plurality of nozzle groups in a case of discharging the ink to a band area from the nozzle of each of the plurality of nozzle groups by assigning halftone data to the nozzle of each of the plurality of nozzle groups, assigns the halftone data assigned to the abnormal nozzle to the nozzle that is included in other pluralities of nozzle groups which are not the nozzle group including the abnormal nozzle according to a ratio that is a preset assignment ratio for each of the other pluralities of nozzle groups.

7 Claims, 8 Drawing Sheets

FIG. 6

NOZZLE USE RATIO DEFINING MASK 16A
(FOR ALL NOZZLE GROUPS)

|    | 1 | 2 | 3 | 4 | 5 | 6 | 7 | 8 | 9 | 10 |
|----|---|---|---|---|---|---|---|---|---|----|
| 1  | 0 | 0 | 0 | 0 | 1 | 0 | 0 | 0 | 1 | 0  |
| 2  | 0 | 1 | 0 | 0 | 0 | 0 | 0 | 1 | 0 | 0  |
| 3  | 0 | 0 | 0 | 1 | 0 | 1 | 0 | 0 | 0 | 1  |
| 4  | 1 | 0 | 1 | 0 | 0 | 0 | 1 | 0 | 0 | 0  |
| 5  | 0 | 1 | 1 | 1 | 0 | 0 | 1 | 1 | 0 | 0  |
| 6  | 1 | 0 | 0 | 1 | 1 | 1 | 0 | 0 | 0 | 1  |
| 7  | 0 | 1 | 1 | 0 | 0 | 0 | 1 | 1 | 1 | 0  |
| 8  | 0 | 1 | 0 | 1 | 1 | 0 | 0 | 1 | 1 | 0  |
| 9  | 1 | 0 | 0 | 0 | 0 | 1 | 0 | 0 | 0 | 1  |
| 10 | 0 | 0 | 1 | 0 | 0 | 0 | 1 | 0 | 1 | 0  |
| 11 | 1 | 0 | 0 | 0 | 1 | 0 | 0 | 0 | 0 | 0  |
| 12 | 0 | 0 | 0 | 0 | 0 | 1 | 0 | 0 | 0 | 1  |

FIG. 7

NOZZLE USE RATIO DEFINING MASK 16B
(FOR NOZZLE GROUPS KG2 AND KG3)

|   | 1 | 2 | 3 | 4 | 5 | 6 | 7 | 8 | 9 | 10 |
|---|---|---|---|---|---|---|---|---|---|----|
| 1 | 0 | 1 | 0 | 0 | 1 | 0 | 1 | 0 | 1 | 0  |
| 2 | 0 | 1 | 0 | 1 | 0 | 0 | 0 | 1 | 0 | 0  |
| 3 | 0 | 1 | 0 | 1 | 0 | 1 | 0 | 0 | 0 | 1  |
| 4 | 1 | 0 | 1 | 0 | 0 | 0 | 1 | 0 | 1 | 0  |
| 5 | 1 | 0 | 1 | 1 | 0 | 1 | 0 | 1 | 0 | 1  |
| 6 | 1 | 0 | 1 | 0 | 1 | 1 | 1 | 0 | 1 | 1  |
| 7 | 1 | 0 | 1 | 0 | 1 | 0 | 1 | 1 | 1 | 0  |
| 8 | 0 | 1 | 0 | 1 | 1 | 1 | 0 | 1 | 0 | 1  |

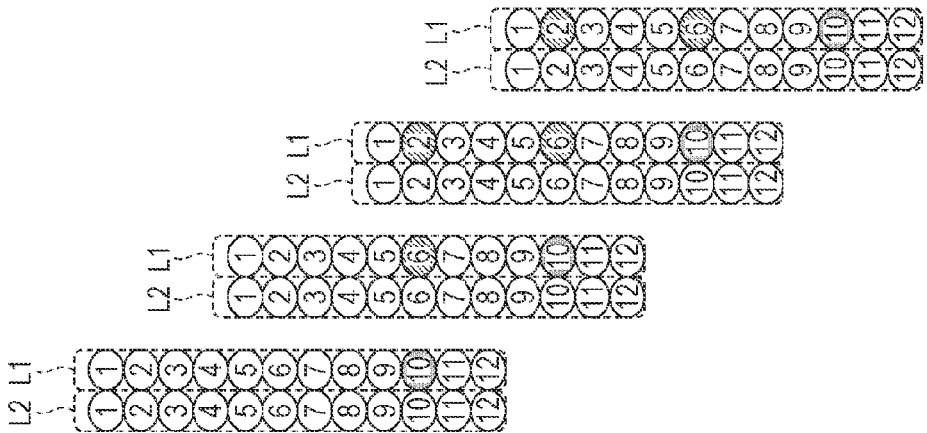

PRINTING APPARATUS, PRINTING SYSTEM, AND PRINTING METHOD

CROSS-REFERENCE TO RELATED APPLICATIONS

This application claims priority to Japanese Patent Application No. 2014-079148 filed on Apr. 8, 2014. The entire disclosure of Japanese Patent Application No. 2014-079148 is hereby incorporated herein by reference.

BACKGROUND

1. Technical Field

The present invention relates to a printing apparatus, a printing system, and a printing method.

2. Related Art

An ink jet printer is provided with a printing head that includes a plurality of nozzles for discharging ink. In such a printing head, nozzles may be clogged due to causes such as when the viscosity of ink increases, when air bubbles are mixed therein, and when grime or paper dust is attached thereto. Clogging (abnormal discharging) of a nozzle causes a missing dot (a type of image degradation) because ink that is to be discharged to a print substrate is not discharged.

There is known a printing control device (refer to JP-A-2001-150685) that supplies a control signal for controlling the movement of a nozzle array to a printing unit which prints an image by forming dots with the nozzle array while moving the nozzle array in a main-scanning direction and a sub-scanning direction with respect to a printing medium. The printing control device is provided with a failed block recognizer, a complementing operation storage device, and a control signal supplier. The failed block recognizer regards the nozzle array as a collection of continuous three or more blocks, each of which includes the same number of nozzles, and recognizes a failed block including a failed nozzle when a nozzle that fails to form a dot occurs in the nozzle array. The complementing operation storage device associates the position of the failed block in the nozzle array with a complementing operation and stores the complementing operation in advance, the complementing operation being intended for complementing the failed block with another block by moving the nozzle array in the sub-scanning direction. The control signal supplier supplies the control signal for printing an image to the printing unit while performing the complementing operation that corresponds to the position of the failed block when the failed block is recognized.

It is necessary to resolve a missing dot caused by such a nozzle having abnormal discharge function as described above. In addition, there is room for improving image quality at the time of complementation when a missing dot is complemented by ink discharged from another nozzle.

SUMMARY

An advantage of some aspects of the invention is to provide a printing apparatus, a printing system, and a printing method that complement image degradation due to abnormal discharging of a nozzle to improve image quality.

According to an aspect of the invention, there is provided a printing apparatus that transports a print substrate in a first direction and moves a printing head which includes a nozzle array in which a plurality of nozzles for discharging a common ink is lined up in the first direction in a second direction which intersects the first direction to perform printing by discharging ink with the nozzle to the print substrate during the movement, the printing apparatus including a discharge control unit that assigns halftone data in which discharging or non-discharging of the ink is determined to the nozzle and controls discharging of ink from the nozzle according to the assigned halftone data, in which the printing head moves along the second direction over a band area that has a predetermined width in the first direction of the print substrate for each nozzle group when the nozzle array is divided into a plurality of nozzle groups that is configured by a predetermined number of nozzles lined up in the first direction, and the discharge control unit, when an abnormal nozzle having abnormal function of discharging the ink is included in any of the plurality of nozzle groups in a case of discharging the ink to the band area from the nozzle of each of the plurality of nozzle groups by assigning the halftone data to the nozzle of each of the plurality of nozzle groups according to a first ratio that is a preset assignment ratio for each of the plurality of nozzle groups, assigns the halftone data assigned to the abnormal nozzle to the nozzle that is included in other pluralities of nozzle groups which are not the nozzle group including the abnormal nozzle according to a second ratio that is a preset assignment ratio for each of the other pluralities of nozzle groups.

In this case, the halftone data that is supposed to be assigned to the abnormal nozzle is the data that is assigned to the abnormal nozzle according to the preset first ratio for each nozzle group which constitutes the nozzle array and includes the nozzle group including the abnormal nozzle. The halftone data that is supposed to be assigned to the abnormal nozzle is assigned to the nozzle that is included in other pluralities of nozzle groups which are not the nozzle group including the abnormal nozzle according to a preset assignment ratio (second ratio) for each of the other pluralities of nozzle groups. Therefore, missing dots caused by the abnormal nozzle are complemented by ink that is discharged by a plurality of nozzles, and favorable image quality is obtained.

It is preferable that the second ratio is a value obtained by adding a value that is obtained from division of the first ratio of the nozzle group including the abnormal nozzle by the number of the other pluralities of nozzle groups to the first ratio for each of the other pluralities of nozzle groups. Alternatively, it is preferable that the second ratio is a value obtained by adding a value that is obtained from distribution of the first ratio of the nozzle group including the abnormal nozzle according to the first ratio for each of the other pluralities of nozzle groups to the first ratio for each of the other pluralities of nozzle groups.

These cases suppress deviation of the ratio of the halftone data assigned for each of the other pluralities of nozzle groups according to the first ratio from the ratio of the halftone data assigned for each of the other pluralities of nozzle groups according to the second ratio. Thus, image quality is uniformed over the entire printing result.

It is preferable that the printing head includes a first nozzle array as the nozzle array and a second nozzle array that is arranged parallel to the first nozzle array in a direction intersecting the first direction, the first nozzle array is configured by a plurality of nozzles for discharging a black ink, the second nozzle array is configured by a plurality of nozzle groups that is divided along the first direction in the same manner as division of the plurality of nozzle groups constituting the first nozzle array, and each of the plurality of nozzle groups constituting the second nozzle array is configured by a plurality of nozzles for discharging a specific color ink.

In this case, the printing head can perform color printing because of including two nozzle arrays of the first nozzle array and the second nozzle array. Thus, the printing head is configured at a low cost. In addition, the plurality of nozzle groups shares and performs discharging of a black ink. Thus, favorable image quality is easily obtained in printing of a photograph and the like that require high image quality.

It is preferable that the number of the divided nozzle groups is, for example, three. In this case, the second nozzle array is configured by, for example, a nozzle group for discharging a cyan ink, a nozzle group for discharging a magenta ink, and a nozzle group for discharging a yellow ink.

The technical idea of the invention is not only realized by the form of the printing apparatus but may also be implemented by other objects. In addition, it is also possible to perceive an invention of a method (printing method) that includes steps corresponding to the features of any form of the printing apparatus described above, an invention of a printing program that allows a predetermined piece of hardware (computer) to perform the method, and an invention of a computer-readable storage medium on which the program is recorded. In addition, the printing apparatus may be realized by a single apparatus or may be realized by a combination of a plurality of apparatuses. When the printing apparatus is realized by a plurality of apparatuses, these apparatuses can be called a printing system, an ink jet printing system, an ink jet system, or the like.

BRIEF DESCRIPTION OF THE DRAWINGS

The invention will be described with reference to the accompanying drawings, wherein like numbers reference like elements.

FIG. 6 is a diagram illustrating a nozzle use ratio defining mask.

FIG. 7 is a diagram illustrating a nozzle use ratio defining mask that is referred to when a nozzle group is downsized before assignment.

FIG. 8 is a diagram illustrating an example of assigning pixels in an abnormal nozzle corresponding pixel array to complementing nozzles.

DESCRIPTION OF EXEMPLARY EMBODIMENTS

Figure 1:
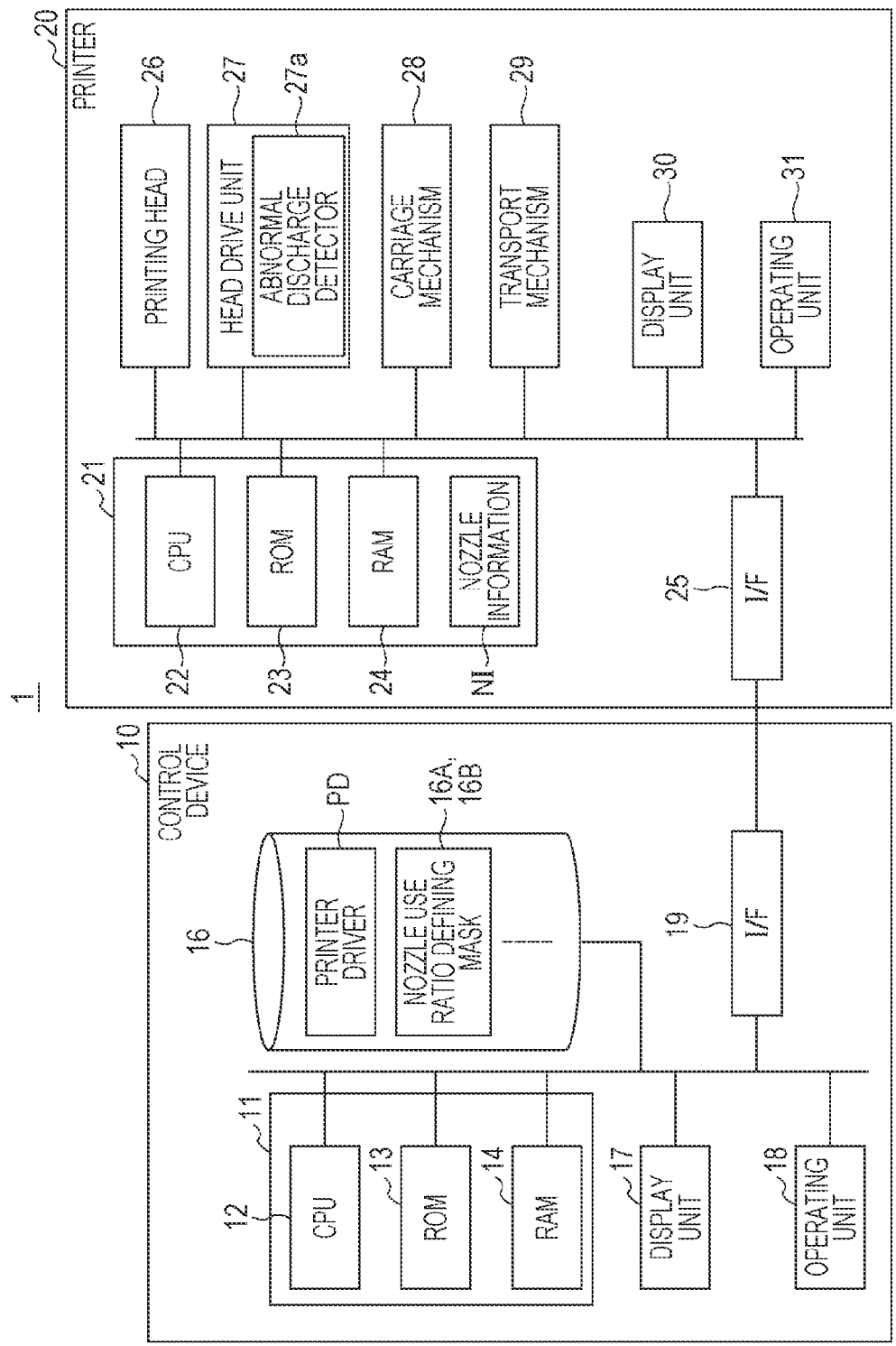
FIG. 1 is a schematic diagram illustrating the apparatus configuration according to an embodiment.

An embodiment of the invention will be described in the following order.
1. Outline of Apparatus Configuration
2. Printing Control Process
3. Modification Example 1. Outline of Apparatus Configuration FIG. 1 schematically illustrates an example of the configuration of a printing system 1 according to the embodiment. The printing system 1 includes a printer 20 as a printing apparatus and a control device 10 for controlling the printer 20. The control device 10 is an apparatus on which a program for controlling the printer 20 is mounted. Examples of the control device 10 include a desktop or laptop personal computer (PC), a tablet terminal, a portable terminal, and the like. A printer is an output apparatus that creates a hard copy recording of data by using discrete graphic character strings as a main form, the graphic character strings belonging to one or more preset character sets (JIS X0012-1990).

Alternatively, the control device 10, the printer 20, and the like constituting the printing system 1 may be individual apparatuses that are connected in a communicable manner or may be combined to constitute one product. For example, the printer 20 may include the control device 10 in a part thereof. In this case, the printer 20 including the control device 10 therein corresponds to the printing system and serves as the main actor of performing a printing method. The printer 20 that takes charge of a part of or the entire printing system 1 may be a multifunction printer that also functions as a scanner, a facsimile, and the like.

A CPU 12 that is the center of operation processing controls the entire control device 10 through a system bus in the control device 10. The bus connects a ROM 13, a RAM 14, various types of an interface (I/F) 19, and the like in addition to, for example, a hard disk drive (HDD) 16 as a storage device. The storage device may be a semiconductor memory and the like. The storage device (HDD 16) stores an operating system, an application program, a printer driver PD, and the like. The CPU 12 appropriately reads these programs into the RAM 14 and executes the programs. The CPU 12, the ROM 13, and the RAM 14 are collectively called a control unit 11. The storage device may store nozzle use ratio defining masks 16A and 16B.

The I/F 19 is connected to the printer 20 in a wired or wireless manner. The control device 10 is further provided with a display unit 17, an operating unit 18, and the like. The display unit 17 is configured by, for example, a liquid crystal display. The operating unit 18 is configured by, for example, a keyboard, a mouse, a touchpad, and a touch panel.

A part of or the entire items (for example, the flowchart in FIG. 3 and the like) that will be described below as being performed by the control device 10 may be realized according to a predetermined program (firmware and the like) by using resources (a processor and a memory) of the printer 20.

An I/F 25 of the printer 20 is communicably connected to the I/F 19 of the control device 10 in a wired or wireless manner and connects a control unit 21 and the like through a system bus. A CPU 22 appropriately reads a program (firmware and the like) stored on a ROM 23 and the like into a RAM 24 and performs predetermined operation processing in the control unit 21. The control unit 21 is connected to each of a printing head 26, a head drive unit 27, a carriage mechanism 28, and a transport mechanism 29 and controls each thereof.

The printing head 26 is supplied with various types of ink from unillustrated cartridges for each of multiple types of liquid (for example, a cyan (C) ink, a magenta (M) ink, a yellow (Y) ink, a black (K) ink, and the like). The printing head 26 can eject (discharge) ink from a plurality of nozzles that is disposed in a manner corresponding to various types of ink. Specific types and the number of liquids used by the printer 20 are apparently not limited to the ones described above. For example, the printer 20 can use various types of liquid and ink such as light cyan (Lc), light magenta, orange, green, gray, light gray, white, and metallic ink and a pre-coating liquid.

The carriage mechanism 28, under control of the control unit 21, moves an unillustrated carriage provided in the printer 20 along a predetermined direction (main-scanning direction) from one end side to the other end side of the main-scanning direction (or from the other end side to the one end side). The main-scanning direction corresponds to a "second direction" in an aspect of the invention. The printing head 26 is mounted on the carriage and is moved along the main-scanning direction by the carriage. The movement of the printing head 26 along the main-scanning direction from the one end side to the other end side or from the other end side to the one end side is also called a "main scan", a "path", and the like.

The transport mechanism 29, under control of the control unit 21, transports a print substrate (refer to a print substrate P in FIG. 2) with an unillustrated roller and the like in a feeding direction that intersects with (is orthogonal to) the main-scanning direction. The feeding direction is a direction of a geometric vector that is related to the movement of the print substrate when the print substrate faces the printing head 26. The feeding direction corresponds to a "first direction" in an aspect of the invention. In the present specification, even when directions, positions, and the like of each configuration are expressed to be orthogonal, parallel, or the like, these expressions not only mean a strictly parallel or orthogonal state but also include error caused by product characteristics within an allowable extent and error that may occur during product manufacturing.

The head drive unit 27, on the basis of printing data (printing data will be described later) obtained by the control unit 21 from the control device 10 through the I/F 25, generates a drive voltage for driving a piezoelectric element that is disposed in a manner corresponding to each nozzle of the printing head 26. The head drive unit 27 outputs the drive voltage to the printing head 26. The piezoelectric element is deformed when the drive voltage is applied thereto to allow the corresponding nozzle to discharge liquid. Accordingly, the printing head 26 that is in motion by the carriage discharges ink (ink droplets) for each type of ink with each nozzle to the print substrate. An image based on the printing data is reproduced on the print substrate by discharged ink being attached to the print substrate to form "dots" on the surface of the print substrate. Therefore, the printer 20 corresponds to an ink jet printer. An ink jet printer is a non-impact printer that forms characters on a paper by ejecting particles or droplets of ink (JIS X0012-1990).

A dot is basically a state of ink hitting the print substrate. The term dot may also be used for convenience of description even in a state of ink before hitting the print substrate. A print substrate is a material that holds a printing image. A print substrate generally has a shape of a rectangle and also has a shape of a circle (for example, optical discs such as a CD-ROM and a DVD), a triangle, a quadrangle, a polygon, and the like. A print substrate includes at least all types and processed products of paper or paperboard disclosed in Japanese Industrial Standards "JIS P0001:1998, vocabulary regarding paper, paperboard, and pulp".

The head drive unit 27 includes an abnormal discharge detector 27a for detecting abnormal nozzles that have abnormal ink discharge function. The nozzle use ratio defining masks 16A and 16B may be stored on a memory (for example, an unillustrated EEPROM and the like) of the printer 20.

The printer 20 is further provided with a display unit 30 and an operating unit 31, and the like. The display unit 30 is configured by, for example, a liquid crystal display. The operating unit 31 is configured by, for example, a button and a touch panel. A unit that allows a nozzle to discharge ink droplets is not limited to the piezoelectric element in the printer 20 and may use a heating element that allows a nozzle to discharge ink droplets by heating ink.

Figure 2:
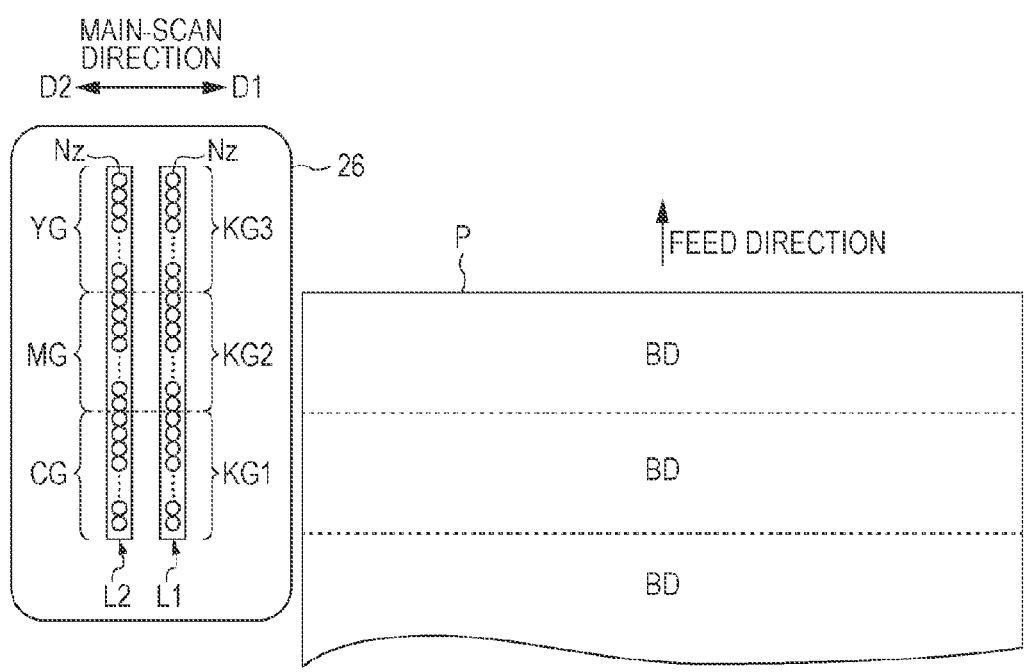
FIG. 2 is a simplified diagram illustrating the configuration and the like of a printing head.

FIG. 2 illustrates the arrangement of nozzles on the lower surface (a surface facing the print substrate P) of the printing head 26. The printing head 26 includes a nozzle array L1 and a nozzle array L2. The nozzle array L1 includes a plurality of nozzles Nz (nozzles for K) that is formed to be lined up in the feeding direction for discharging a K ink as a monochrome ink. The nozzle array L2 includes a plurality of nozzles Nz that is formed to be lined up in the feeding direction for discharging C, M, and Y inks as a color (chromatic) ink. The nozzle array L1 and the nozzle array L2 are in a parallel state and are arranged in a parallel manner in the main-scanning direction. The nozzle array L1 corresponds to a "first nozzle array" in an aspect of the invention, and the nozzle array L2 corresponds to a "second nozzle array" in an aspect of the invention.

The density (number of nozzles/inch (npi)) of the nozzles Nz in each of the nozzle arrays L1 and L2 is equal to, for example, the printing resolution (number of dots/inch (dpi)) of the printer 20 in the feeding direction. The nozzle array L2 further includes a nozzle array (nozzle group CG) configured by a plurality of nozzles Nz for discharging a C ink (nozzles for C) that is lined up in the feeding direction, a nozzle array (nozzle group MG) configured by a plurality of nozzles Nz for discharging an M ink (nozzles for M) that is lined up in the feeding direction, and a nozzle array (nozzle group YG) configured by a plurality of nozzles Nz for discharging a Y ink (nozzles for Y) that is lined up in the feeding direction. In other words, the nozzle group CG, the nozzle group MG, and the nozzle group YG, each of which discharges a specific color ink, are formed to be differently located in the direction of the contacting line between these arrays and constitute the nozzle array L2 together.

The nozzle array L1 is divided into nozzle groups that are paired with each of the nozzle group CG, the nozzle group MG, and the nozzle group YG. The word "paired" here means a relationship of nozzle groups included in the same range in the feeding direction. For example, the range of a part of the nozzle array L1 that is paired with the nozzle group CG is called a nozzle group KG1, the range of a part of the nozzle array L1 that is paired with the nozzle group MG is called a nozzle group KG2, and the range of a part of the nozzle array L1 that is paired with the nozzle group YG is called a nozzle group KG3. The same number of nozzles Nz are included in each of the nozzle group CG, the nozzle group MG, the nozzle group YG, the nozzle group KG1, the nozzle group KG2, and the nozzle group KG3.

According to the printing head 26, the paired nozzle groups can perform printing in an area having a predetermined width (band area BD) on the print substrate P in the feeding direction. That is to say, a color image having colors of CMYK is completed in one band area BD by performing printing with the pair of the nozzle group KG1 and the nozzle group CG, the pair of the nozzle group KG2 and the nozzle group MG, and the pair of the nozzle group KG3 and the nozzle group YG in that one band area BD. The predetermined width of one band area BD corresponds to the length of one nozzle group (length in the feeding direction). Only a part of the nozzle groups KG1, KG2, and KG3 may be used in discharging a K ink to the band area BD instead of using all of the nozzles KG1, KG2, and KG3. A nozzle array for discharging a monochrome ink and a nozzle array for discharging a chromatic ink may be configured by not only one nozzle array for each but also, for example, a plurality of nozzle arrays that is in a parallel state and is differently located at a predetermined pitch in the feeding direction.

2. Printing Control Process

Figure 3:
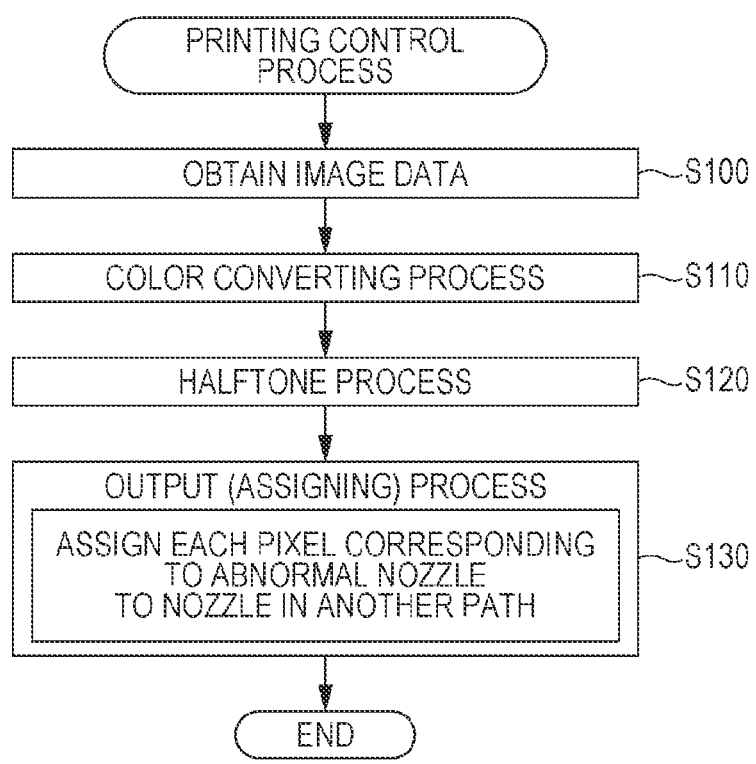
FIG. 3 is a flowchart illustrating a printing control process.

FIG. 3 illustrates, with a flowchart, a printing control process through which the control device 10 allows the printer 20 to perform printing according to the printer driver PD.

In step S100, the control unit 11 obtains, from a predetermined input source, image data that is arbitrarily selected by a user. The user can arbitrarily select the image data representing an image to print on the print substrate by operating the operating unit 18 and the like while viewing a user interface screen (UI screen) displayed on the display unit 17 and the like. The image data means digital data representing an image. The input source of the image data is not particularly limited. For example, the input source corresponds to all types of image input devices that are communicably connected to the control device 10 in addition to the HDD 16 and an unillustrated memory card and the like that are externally inserted into the control device 10 or the printer 20.

The image data obtained in step S100 is in, for example, bitmap format and is RGB data in which the concentration of element colors such as red (R), green (G), and blue (B) for each pixel is represented with gradations (for example, 256 gradations of 0 to 255). When the obtained image data does not correspond to the RGB color model, the control unit 11 converts the obtained image data into RGB color model data. Furthermore, the control unit 11 appropriately performs a resolution converting process and the like for the image data so as to align the resolution of the image data to the printing resolution of the printer 20 in the main-scanning direction and the feeding direction.

In step S110, the control unit 11 performs a color converting process for the image data obtained after step S100. That is to say, the control unit 11 converts the color model used in the image data into an ink color model (for example, CMYK) that the printer 20 uses in printing. The color converting process is performed for each pixel with reference to a color conversion table (lookup table) in which a conversion relationship between those color models is predefined. As described above, the RGB gradation value of each pixel is converted into the amount of ink for CMYK when the image data represents the color of each pixel with RGB gradations. The CMYK value after the color conversion is represented by, for example, numerical values such as 0 to 100(%) in a stepwise manner and represents the amount (concentration) of ink at the corresponding pixel with gradations. The image data represented by the CMYK value for each pixel is also called "ink amount data" hereinafter.

In step S120, the control unit 11 performs a halftone process (halftoning) for the image data (ink amount data) obtained after step S110 and converts the image data into the printing data. The control unit 11, for example, may perform the halftone process with dithering that uses a predefined dither mask or may perform the halftone process with error diffusion. The halftone process generates the printing data (halftone data) in which discharging (dotted) or non-discharging (dotless) of each of CMYK inks is determined for each pixel.

In step S130, the control unit 11 sorts the pixels constituting the printing data (halftone data) generated in step S120 into order of transmission of the pixels that is to be performed to the printing head 26 according to a predetermined rule of pixel assignment to nozzles. The sorting process confirms which one of the nozzles in the printing head 26 discharges ink at which timing in which path to form dots that are defined by the pixels constituting the printing data, depending on the position of pixels and the ink color. The printing data after the sorting process that is performed according to the predetermined rule of pixel assignment is output to the printer 20 through the I/F 19 in the order determined after the sorting process (output process). Accordingly, the pixels constituting the printing data are substantially assigned to any of the nozzles that the printing head 26 includes.

The printer 20 controls the main scan of the printing head 26 (path), discharging or non-discharging of ink from each nozzle, and feeding of the print substrate on the basis of the printing data that is input through the I/F and prints the image that is represented by the image data obtained in step S100 on the print substrate.

In view of performing the processes of steps S120 and S130, the control unit 11 functions as a discharge control unit that assigns the halftone in which discharging or non-discharging of ink is determined to the nozzles and controls discharging of ink from the nozzles according to the assigned halftone data. The concept of the discharge control unit may apparently include the configuration of the printer 20.

In the present embodiment, the printer 20 moves the printing head 26 over one band area BD of the print substrate for each nozzle group (paired nozzle group) to perform printing. There are unidirectional printing and bidirectional printing for such printing, and any of unidirectional printing and bidirectional printing may be used in the present embodiment. Unidirectional printing, given that the direction from the one end side to the other end side of the main-scanning direction is an "outward direction", and the direction from the other end side to the one end side of the main-scanning direction is an "inward direction", is a printing operation of discharging ink to the print substrate with the printing head 26 only at the time of the main scan of the printing head 26 in the outward direction (or only at the time of the main scan of the printing head 26 in the inward direction). Meanwhile, bidirectional printing is a printing operation of discharging ink to the print substrate with the printing head 26 at both times of the main scans of the printing head 26 in the outward direction and the inward direction. In FIG. 2, a sign D1 represents the outward direction, and the sign D2 represents the inward direction.

The predetermined rule of pixel assignment includes at least a rule in which, when an abnormal nozzle having abnormal ink discharge function is included in any (for example, the nozzle group KG1) of the nozzle groups KG1, KG2, and KG3 in a case of discharging ink (K ink) to the band area BD with the nozzles in each of the nozzle groups KG1, KG2, and KG3 by assigning the halftone data that is in accordance with a first ratio which is a preset assignment ratio for each of the nozzle groups KG1, KG2, and KG3 to the nozzles (nozzles for K) in each of the plurality of nozzle groups KG1, KG2, and KG3, the halftone data assigned to the abnormal nozzle is assigned to a nozzle that is included in other pluralities of nozzle groups (nozzle groups KG2 and KG3) which are not the nozzle group including the abnormal nozzle according to a second ratio that is a preset assignment ratio for each of the other pluralities of nozzle groups (nozzle groups KG2 and KG3).

An abnormal nozzle includes all of the nozzles that cannot discharge ink droplets normally (have abnormal discharge function) even though a discharge operation is performed by applying the drive voltage. Examples of causes of abnormal discharging include air bubbles being mixed into a nozzle or an ink channel that communicates with a nozzle, dried or thickened (adhering) ink in the vicinity of a nozzle, paper dust adhering to the vicinity of a nozzle opening, and the like. Abnormal discharging, when occurs, typically results in ink being not discharged from a nozzle and thus causes a phenomenon (missing dot) of dots that are to be formed on the print substrate being not formed. In addition, even when ink is discharged from a nozzle, missing dots occur easily in a case of abnormal discharging because the amount of droplets is excessively small, and the direction of flying ink (trajectory) is deviated to cause ink not to hit the print substrate appropriately.

In the present embodiment, the control unit 21 of the printer 20 stores nozzle information NI (refer to FIG. 1) on, for example, an unillustrated EEPROM and the like. The nozzle information NI is a piece of information in which presence or absence of abnormal discharging is written for each nozzle that the printing head 26 includes. The nozzle information NI may desirably be a piece of information with which presence or absence of abnormal discharging for each nozzle is directly or indirectly determined. The present embodiment does not ask for a particular process for generating the nozzle information NI. All known technologies intended for determining and detecting abnormal discharging of a nozzle may be used in the present embodiment. For example, the printer 20 can determine presence or absence of abnormal discharging for each nozzle with the abnormal discharge detector 27a by using the manner disclosed in JP-A-2013-126776 and output the result as the nozzle information NI to the control unit 21. Specifically, normal discharging or abnormal discharging of ink from a nozzle is determined by measuring the waveform (cycle and the like) of residual vibrations of a so-called vibrating plate and the like that bend in response to the piezoelectric element being deformed by the applied drive voltage. Alternatively, presence or absence of abnormal discharging for each nozzle may be determined by evaluating, artificially or automatically, presence or absence of a missing dot in a test pattern that is printed by the printing head 26 discharging ink from each nozzle, and the determination result may be written as the nozzle information NI.

A detailed description will be provided for the process of assigning a pixel to a nozzle in above step S130.

Figure 4:
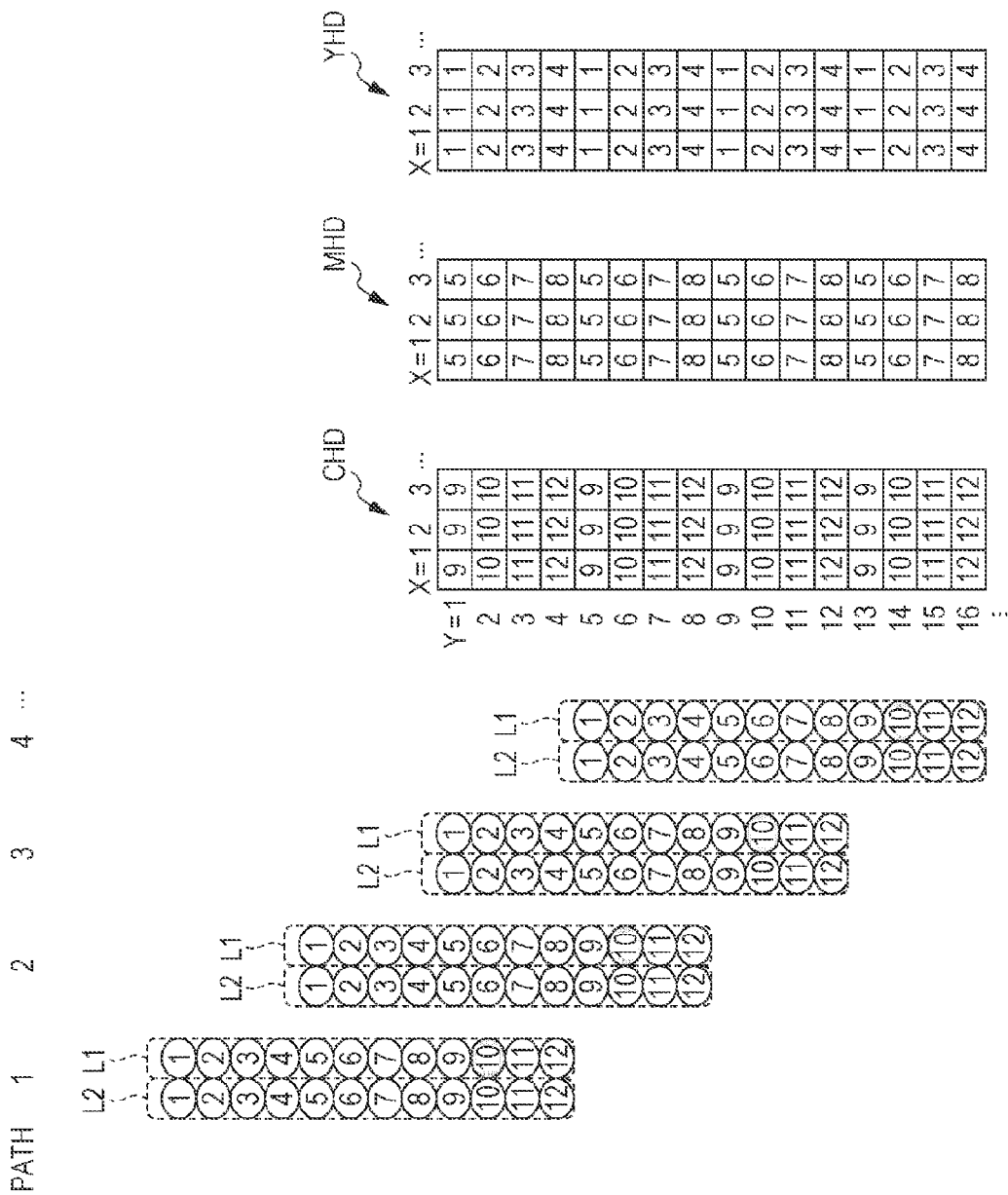
FIG. 4 is a diagram illustrating an assignment relationship between nozzles for color ink and pixels.
Figure 5:
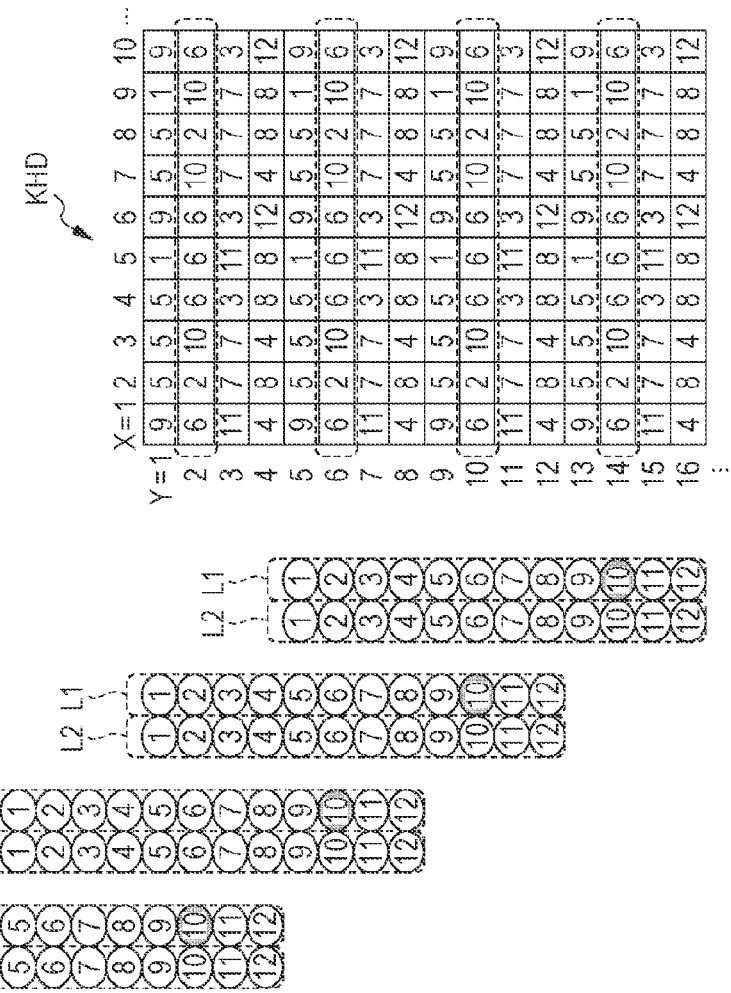
FIG. 5 is a diagram illustrating an assignment relationship between nozzles for K ink and pixels.

FIG. 4 is a diagram for describing a correspondence between the nozzles constituting the nozzle arrays L1 and L2 and the pixels constituting the halftone data (CHD, MHD, and YHD) that is assigned to the nozzles. FIG. 5 is a diagram for describing a correspondence between the nozzles constituting the nozzle arrays L1 and L2 and the pixels constituting the halftone data KHD that is assigned to the nozzles. The left of FIGS. 4 and 5 illustrates an example of the nozzle arrays L1 and L2, each of which is configured by 12 nozzles (circle mark) in order to simplify the description. Nozzle numbers are given as numbers from 1 to 12 in the circle marks that represent nozzles from one end to the other end of the nozzle arrays L1 and L2. In comparison with the description of FIG. 2, nozzle numbers 1 to 4 in the nozzle array L1 illustrated in FIGS. 4 and 5 correspond to the nozzle group KG3, nozzle numbers 5 to 8 in the nozzle array L1 to the nozzle group KG2, and nozzle numbers 9 to 12 in the nozzle array L1 to the nozzle group KG1. In addition, nozzle numbers 1 to 4 in the nozzle array L2 illustrated in FIGS. 4 and 5 correspond to the nozzle group YG, nozzle numbers 5 to 8 in the nozzle array L2 to the nozzle group MG, and nozzle numbers 9 to 12 in the nozzle array L2 to the nozzle group CG.

FIGS. 4 and 5 illustrate that the position (relative position to the print substrate in the feeding direction) of the printing head 26 (nozzle arrays L1 and L2) changes for each path (a first path, a second path, a third path, a fourth path, . . . ) of the printing head 26. In actuality, the printing head 26 does not move in the feeding direction, but the print substrate is moved by a constant amount of feeding (amount of feeding corresponding to the width of the band area BD) in the feeding direction by the transport mechanism 29 each time after one path ends.

The right of FIGS. 4 and 5 respectively illustrates a part of the halftone data (CHD, MHD, and YHD) generated in above step S120 and a part of the halftone data KHD generated in above step S120 with a collection of a plurality of pixels (rectangles) that is arranged in an X direction (corresponds to the main-scanning direction) and a Y direction (corresponds to the feeding direction). The halftone data CHD is the halftone data in which discharging or non-discharging of a C ink is determined for each pixel. The halftone data MHD is the halftone data in which discharging or non-discharging of an M ink is determined for each pixel. The halftone data YHD is the halftone data in which discharging or non-discharging of a Y ink is determined for each pixel. The halftone data KHD is the halftone data in which discharging or non-discharging of a K ink is determined for each pixel.

The halftone data (CHD, MHD, YHD, and KHD) has resolutions in the X direction and the Y direction that respectively correspond to the printing resolutions of the printer 20 in the main-scanning direction and the feeding direction. The numbers 1, 2, 3, . . . given outside the halftone data (CHD, MHD, YHD, and KHD) in each of the X direction and the Y direction indicate the position (X and Y coordinates) of each pixel in the halftone data (CHD, MHD, YHD, and KHD). The halftone data (CHD, MHD, YHD, and KHD), that is, blocks for each ink color are apparently to overlap with each other when viewed as one "picture" but are separately illustrated in FIGS. 4 and 5 for easy understanding. In the examples in FIGS. 4 and 5, a number in a rectangle illustrating a pixel means a nozzle number to which the pixel is assigned. Apparently, the nozzle numbers assigned to the pixels in the halftone data (CHD, MHD, and YHD) illustrated in FIG. 4 are the nozzle numbers in the nozzle array L2, and the nozzle numbers assigned to the pixels in the halftone data KHD illustrated in FIG. 5 are the nozzle numbers in the nozzle array L1.

The control unit 11, in step S130, assigns each pixel constituting the halftone data (CHD, MHD, YHD, and KHD) to nozzles on the basis of a printing method that is preset for the printer 20. The printing method referred hereto is a behavior of the printer 20 that is determined by the printing resolution in each of the main-scanning direction and the feeding direction, the amount of feeding of the print substrate each time after one path ends, the number of paths required for performing printing in one band area BD (three paths here), the content of the nozzle use ratio defining mask 16A, and the like. The assignment result is illustrated in the halftone data (CHD, MHD, and YHD) in FIG. 4 and the halftone data KHD in FIG. 5.

Printing in one band area BD in total three paths has a different meaning in discharging of a K ink and in discharging of color inks (C, M, and Y inks). Specifically, each of C, M, and Y inks is discharged in one of total three paths required for performing printing in one band area BD. Meanwhile, a K ink is specifically discharged in all of the three paths. Hereinafter, for convenience of description, the initial path among total three paths required for performing printing in one band area BD is called a "preceding path", and the nozzles used in the preceding path are called "preceding nozzles". In addition, the last path among total three paths is called a "succeeding path", and the nozzles used in the succeeding path are called "succeeding nozzles". The path between the preceding path and the succeeding path among total three paths is called an "intermediate path", and the nozzles used in the intermediate path are called "intermediate nozzles".

Regarding C, M, and Y inks, it is apparent from the relationship between the lined-up nozzle groups CG, MG, and YG in the nozzle array L2 illustrated in FIG. 2 that the nozzle group CG (preceding nozzle) is used in the preceding path, the nozzle group MG (intermediate nozzle) is used in the intermediate path, and the nozzle group YG (succeeding path) is used in the succeeding path among total three paths required for performing printing in one band area BD. The pixel arrays of Y=1 to 4 illustrated in FIG. 4 are focused on here as an example. In the present embodiment, a "pixel array" means an area of pixels that have the same Y coordinate and are continuous in the X direction from one end to the other end of the halftone data (CHD, MHD, YHD, and KHD). One pixel array represents one raster line. In the pixel arrays of Y=1 to 4, the pixels constituting the halftone data CHD are assigned to the nozzle numbers 9 to 12 (nozzle group CG) in the nozzle array L2 in the first path (preceding path). The pixels constituting the halftone data MHD are assigned to the nozzle numbers 5 to 8 (nozzle group MG) in the nozzle array L2 in the second path (intermediate path). The pixels constituting the halftone data YHD are assigned to the nozzle numbers 1 to 4 (nozzle group YG) in the nozzle array L2 in the third path (succeeding path). The pixel arrays of Y=1 to 4 (including the pixel arrays of Y=1 to 4 illustrated in FIG. 5) represent an image printed in the band area BD that is on the tip end side (leading side of the feeding direction) of the print substrate P.

Similarly, focusing on the pixel arrays of Y=5 to illustrated in FIG. 4, the pixels constituting the halftone data CHD are assigned to the nozzle numbers 9 to 12 (nozzle group CG) in the nozzle array L2 in the second path (preceding path). The pixels constituting the halftone data MHD are assigned to the nozzle numbers 5 to 8 (nozzle group MG) in the nozzle array L2 in the third path (intermediate path). The pixels constituting the halftone data YHD are assigned to the nozzle numbers 1 to 4 (nozzle group YG) in the nozzle array L2 in the fourth path (succeeding path). The pixel arrays of Y=5 to 8 (including the pixel arrays of Y=5 to 8 illustrated in FIG. 5) represent an image printed in the band area BD next to the band area BD that is on the tip end side of the print substrate P.

Meanwhile, assignment of the pixels in the halftone data KHD to the nozzles for K constituting the nozzle array L1 is determined with reference to the nozzle use ratio defining mask 16A.

FIG. 6 illustrates the nozzle use ratio defining mask 16A that is referred to for discharging a K ink to one band area BD with all of the nozzle groups KG1, KG2, and KG3 constituting the nozzle array L1. The nozzle use ratio defining mask 16A is a matrix having a vertical axis that indicates the nozzle number in the nozzle array L1 and a horizontal axis that indicates the position of pixels in the pixel array. In the nozzle use ratio defining mask 16A, the cells of the nozzle numbers 1 to 4 define the ratio of use of each nozzle belonging to the nozzle group KG3. The cells of the nozzle numbers 5 to 8 define the ratio of use of each nozzle belonging to the nozzle group KG2. The cells of the nozzle numbers 9 to 12 define the ratio of use of each nozzle belonging to the nozzle group KG1.

The cells of the nozzle numbers 1 to 4, the cells of the nozzle numbers 5 to 8, and the cells of the nozzle numbers 9 to 12 in the nozzle use ratio defining mask 16A define the "first ratio that is an assignment ratio for each of the plurality of nozzle groups". More specifically, in the nozzle use ratio defining mask 16A, the number "1" indicates the position of pixels where the corresponding nozzle having the same number is used, and the number "0" indicates the position of pixels where nozzles other than the corresponding nozzle having the same number are used. That is to say, focusing on cells corresponding to one nozzle number, the ratio of the position of pixels with "1" to the entire position of pixels is the ratio of use of the nozzle corresponding to that one nozzle number.

The nozzle use ratio defining mask 16A is designed in a manner in which the sum of the ratios of use of the nozzles having a corresponding position in each of the nozzle groups KG1, KG2, and KG3 is 100%. The "nozzles having a corresponding position" means the nozzles of which the position in each of the nozzle groups is the same. When each nozzle group is configured by J (J=4 in the examples in FIGS. 4 and 5) nozzles, the position of a nozzle in the nozzle group is, for example, a position counted from the leading side of the feeding direction in the J nozzles. For example, the sum of the ratio of use of the nozzle number 12 belonging to the nozzle group KG1 (2/10), the ratio of use of the nozzle number 8 belonging to the nozzle group KG2 (5/10), and the ratio of use of the nozzle number 4 belonging to the nozzle group KG3 (3/10) is 10/10, that is, 100%.

The nozzle use ratio defining mask 16A is a mask in which the positions of pixels where the same nozzle is used are comparatively distributed (not to be continuous as far as possible). For example, the positions of pixels where the same nozzle is used are not continuous at all in the cells of the nozzle numbers 1 to 4 and the cells of the nozzle numbers 9 to 12 in the nozzle use ratio defining mask 16A. Distributing the positions of pixels where the same nozzle is used prevents image degradation due to spreading of ink, prevents the positions of dots formed by the same nozzle being continuously displaced, and achieves the effect of improving image quality. In addition, the nozzle use ratio defining mask 16A illustrated in FIG. 6 is a mask in which a ratio of use of 50% is averagely given to the nozzle group KG2 that is at the center of the nozzle array L1, and a ratio of use of 25% is averagely given to each of the nozzle groups KG1 and KG3 that are at both ends of the nozzle array L1. This is based on consideration for stabilizing image quality by equalizing the manner of overlapping a K ink and C, M, and Y inks in the process of discharging a K ink to one band area BD in the divided paths of the preceding path, the intermediate path, and the succeeding path.

The expression "use" of a nozzle is used in the description related to the nozzle use ratio defining mask 16A and the like, but this does not mean to guarantee the actual use of a nozzle (discharging of ink from a nozzle). Whether to discharge ink with a nozzle depends on whether the pixel assigned to the nozzle is a "dotted" pixel. Therefore, the expression "use" of a nozzle in the description related to the nozzle use ratio defining mask 16A and the like merely means assigning a pixel (regardless of a dotted or dotless pixel) to a nozzle as information processing.

The control unit 11 assigns each pixel in each pixel array of the halftone data KHD to the preceding path, the intermediate path, and the succeeding path on the basis of the nozzle use ratio defining mask 16A.

Focusing on the pixel array of Y=1 illustrated in FIG. 5, for example, each pixel constituting the pixel array is assigned to the ninth nozzle (preceding nozzle) in the first path (preceding path), the fifth nozzle (intermediate nozzle) in the second path (intermediate path), and the first nozzle (succeeding nozzle) in the third path (succeeding path) at a ratio of 3:5:2 in the arrangement that is in accordance with the cells of the nozzle numbers 9, 5, and 1 in the nozzle use ratio defining mask 16A. In addition, for example, each pixel constituting the pixel array of Y=7 illustrated in FIG. 5 is assigned to the eleventh nozzle (preceding nozzle) in the second path (preceding path), the seventh nozzle (intermediate nozzle) in the third path (intermediate path), and the third nozzle (succeeding nozzle) in the fourth path (succeeding path) at a ratio of 2:5:3 in the arrangement that is in accordance with the cells of the nozzle numbers 11, 7, and 3 in the nozzle use ratio defining mask 16A.

The control unit 11, in above step S130, reads the nozzle information NI from the printer 20 and determines presence or absence of a nozzle having abnormal discharge function on the basis of the nozzle information NI. When determining that a nozzle having abnormal discharge function does not exist, the control unit 11 uses the assignment of each pixel to each nozzle illustrated in FIGS. 4 and 5. Meanwhile, when determining that a nozzle having abnormal discharge function exists, the control unit 11 performs a process described below.

It is assumed as an example that the control unit 11, in above step S130, reads the nozzle information NI from the printer 20 and recognizes on the basis of the nozzle information NI that, for example, the tenth nozzle (the nozzle illustrated in gray in FIGS. 4 and 5) in the nozzle array L1 has abnormal discharge function, that is, the tenth nozzle is an "abnormal nozzle". Hereinafter, the pixel assigned to an abnormal nozzle is called an "abnormal nozzle corresponding pixel". In addition, the pixel array including an abnormal nozzle corresponding pixel is called an "abnormal nozzle corresponding pixel array". The abnormal nozzle corresponding pixel when reproduced on the print substrate actually becomes a missing dot even though ink is to be discharged. The abnormal nozzle corresponding pixel corresponds to "halftone data assigned to an abnormal nozzle" in an aspect of the invention. As a result of the above assignment, FIG. 5 illustrates the abnormal nozzle corresponding pixel array (the pixel arrays of Y=2, 6, 10, 14, . . . in the halftone data KHD) including the abnormal nozzle corresponding pixel that is assigned to the tenth nozzle in the nozzle array L1 which is an abnormal nozzle by enclosing the abnormal nozzle corresponding pixel array with a dashed line.

The control unit 11, in above step S130, assigns the abnormal nozzle corresponding pixel array to a nozzle that is included in other nozzle groups except the nozzle group including the abnormal nozzle and has a position corresponding to the abnormal nozzle (correct the assignment). In the examples in FIGS. 4 and 5, since the tenth nozzle in the nozzle array L1 is an abnormal nozzle, each pixel constituting the abnormal nozzle corresponding pixel array is assigned to the sixth nozzle of the nozzle array L1 that is included in the nozzle group KG2 and the second nozzle of the nozzle array L1 that is included in the nozzle group KG3 other than the nozzle group KG1 including the abnormal nozzle. That is to say, the number of nozzle groups to which the pixels in the abnormal nozzle corresponding pixel array which includes the abnormal nozzle corresponding pixel are assigned is decreased (from three to two). As such, when the number of nozzle groups to which pixels are assigned is decreased, the control unit 11 assigns pixels to nozzles with reference to a nozzle use ratio defining mask (nozzle use ratio defining mask 16B) that corresponds to the decreased number of nozzle groups.

FIG. 7 illustrates the nozzle use ratio defining mask 16B that is referred to when each pixel in the abnormal nozzle corresponding pixel array is assigned to the nozzles in the nozzle group KG2 and the nozzles in the nozzle group KG3. That is to say, the nozzle use ratio defining mask 16B illustrated in FIG. 7 is referred to in the previous example because the abnormal nozzle is included in the nozzle group KG1. The basic interpretation of the nozzle use ratio defining mask 16B is the same as the nozzle use ratio defining mask 16A. The cells of the nozzle numbers 1 to 4 and the cells of the nozzle numbers 5 to 8 in the nozzle use ratio defining mask 16B in FIG. 7 define the "second ratio that is an assignment ratio for each of the other pluralities of nozzle groups which are not the nozzle group including the abnormal nozzle". The nozzle use ratio defining mask 16B is designed in a manner in which the sum of the ratios of use of the nozzles having a corresponding position in each of the nozzle groups KG2 and KG3 is 100%.

For example, the sum of the ratio of use of the nozzle number 8 belonging to the nozzle group KG2 (6/10) and the ratio of use of the nozzle number 4 belonging to the nozzle group KG3 (4/10) is 10/10, that is, 100%. In addition, the sum of the ratio of use of the nozzle number 6 belonging to the nozzle group KG2 (7/10) and the ratio of use of the nozzle number 2 belonging to the nozzle group KG3 (3/10) is 10/10, that is, 100%.

The ratio of the ratios of use for each of the nozzle groups KG2 and KG3 in the nozzle use ratio defining mask 16B is set not to deviate as far as possible from the ratio of the ratios of use for each of the nozzle groups KG2 and KG3 in the nozzle use ratio defining mask 16A. The ratios of use for each of the nozzle groups KG2 and KG3 in the nozzle use ratio defining mask 16A are approximately 50% and 25% as described above. In addition, the ratio of use of the nozzle group KG1 in the nozzle use ratio defining mask 16A is approximately 25%. Therefore, the approximate ratios of use of the nozzle group KG2 and the nozzle group KG3 in the nozzle use ratio defining mask 16B illustrated in FIG. 7 are set to values (62.5% and 37.5%) that are obtained by adding a value (12.5%) which is obtained from division of the ratio of use of the nozzle group KG1 of 25% in the nozzle use ratio defining mask 16A by the number of nozzle groups for K ink other than the nozzle group KG1 (that is, two) to the ratios of use of each of the nozzle groups KG2 and KG3 (50% and 25%) in the nozzle use ratio defining mask 16A.

Alternatively, the approximate ratios of use of the nozzle group KG2 and the nozzle group KG3 in the nozzle use ratio defining mask 16B may be set to values (approximately 66.7% and approximately 33.3%) that are obtained by adding values (approximately 16.7% and approximately 8.3%) which are obtained from distribution of the ratio of use of the nozzle group KG1 of 25% in the nozzle use ratio defining mask 16A at the ratio of the ratios of use of the nozzle groups KG2 and KG3 (50:25) in the nozzle use ratio defining mask 16A to the ratios of use of each of the nozzle groups KG2 and KG3 (50% and 25%) in the nozzle use ratio defining mask 16A. Any of these manners sets the ratios of use for each of the nozzle groups KG2 and KG3 in the nozzle use ratio defining mask 16B to values close to the ratios of use for each of the nozzle groups KG2 and KG3 in the nozzle use ratio defining mask 16A. This can suppress a difference in image quality between missing dots that are caused by abnormal nozzles and are complemented by using the nozzles in the nozzle group KG2 and the nozzles in the nozzle group KG3 and other places that are printed by using each of the nozzle groups KG1, KG2, and KG3.

The nozzle use ratio defining mask 16B illustrated in FIG. 7 is a mask that defines a rule for assigning pixels in the abnormal nozzle corresponding pixel array to the nozzles in the nozzle group KG2 and the nozzles in the nozzle group KG3. The number of nozzle use ratio defining masks 16B prepared in advance is the number of combinations of two nozzle groups among the nozzle groups constituting the nozzle array L1. That is to say, the HDD 16 and the like store in advance the nozzle use ratio defining mask 16B (the nozzle use ratio defining mask 16B that defines a rule of assigning pixels in the abnormal nozzle corresponding pixel array to the nozzles in the nozzle group KG1 and the nozzles in the nozzle group KG3) that is referred to when the abnormal nozzle is included in the nozzle group KG2 and the nozzle use ratio defining mask 16B (the nozzle use ratio defining mask 16B that defines a rule of assigning pixels in the abnormal nozzle corresponding pixel array to the nozzles in the nozzle group KG1 and the nozzles in the nozzle group KG2) that is referred to when the abnormal nozzle is included in the nozzle group KG3.

FIG. 8 illustrates the result of assigning each pixel constituting the abnormal nozzle corresponding pixel array to nozzles on the basis of the nozzle use ratio defining mask 16B in FIG. 7. FIG. 8 illustrates a correspondence between the nozzles constituting the nozzle array L1 and the pixels constituting the halftone data KHD that is assigned to the nozzles in the same manner of representation as FIG. 5. In FIG. 8, only the nozzles to which the abnormal nozzle corresponding pixel array (the pixel arrays of Y=2, 6, 10, 14, . . . in the halftone data KHD) is assigned are changed when compared with the nozzles in FIG. 5, and the abnormal nozzle corresponding pixel array is assigned to the sixth nozzle of the nozzle array L1 that is included in the nozzle group KG2 and the second nozzle of the nozzle array L1 that is included in the nozzle group KG3. Therefore, in the example in FIG. 8, the sixth nozzle and the second nozzle in the nozzle array L1 are the nozzles (complementing nozzles) that complement missing dots caused by the abnormal nozzle. FIG. 8 illustrates the complementing nozzles with hatching.

The control unit 11, when determining with reference to the nozzle information NI that an abnormal nozzle exists, controls discharging or non-discharging of ink from each nozzle provided in the printing head 26 on the basis of the halftone data (CHD, MHD, YHD, and KHD) that includes the halftone data KHD in which pixels of the abnormal nozzle corresponding pixel array are assigned to the complementing nozzles on the basis of the nozzle use ratio defining mask 16B. As a result, according to the example in FIG. 8, a K ink is not discharged from the abnormal nozzle when the nozzle group KG1 moves over a certain band area BD to discharge a K ink to the band area BD (that is, during the preceding path) and is discharged from each complementing nozzle to the blank places where a K ink is not discharged from the abnormal nozzle in the subsequent paths of the intermediate path and the succeeding path.

According to the present embodiment, the data that is assigned to the abnormal nozzle and is the halftone data (FIG. 5) which is assigned to the nozzles in each nozzle group constituting the nozzle array L1 on the basis of the nozzle use ratio defining mask 16A is assigned to the nozzles in other pluralities of nozzle groups that do not include the abnormal nozzle on the basis of the nozzle use ratio defining mask 16B (FIG. 8). Therefore, missing dots caused by the abnormal nozzle are complemented by ink that is discharged by multiple complementing nozzles. This produces favorable image quality resulting from complementation of missing dots. Particularly, in printing of a color photograph and the like, recording a band area or a raster line through a plurality of paths leads to improvement of image quality. The present embodiment performs complementation through a plurality of paths even when complementing missing dots caused by the abnormal nozzle. Thus, the present embodiment, particularly in printing of a color photograph and the like, contributes to improvement of image quality including the places where missing dots are complemented.

The embodiment is not limited to the content described above and may be considered in various forms. For example, a modification example such as the one described below can be adopted. Configurations made by appropriately combining each of the embodiment and a modification example also fall within the extent of disclosure of the invention. In the following description of a modification example, description of the items that are common to the above embodiment will be appropriately omitted.

3. Modification Example

There may be a case where multiple complementing nozzles may not be provided consequentially when the embodiment is performed. That is to say, it is considered in the examples in FIGS. 5 and 8 that one of nozzles (the sixth nozzle and the second nozzle in the nozzle array L1) having a corresponding position to the abnormal nozzle (the tenth nozzle in the nozzle array L1) in other nozzle groups is an abnormal nozzle. When, for example, the tenth nozzle and the sixth nozzle in the nozzle array L1 are abnormal nozzles, only the second nozzle in the nozzle array L1 serves as a complementing nozzle for these abnormal nozzles. When the tenth nozzle and the second nozzle in the nozzle array L1 are abnormal nozzles, only the sixth nozzle in the nozzle array L1 serves as a complementing nozzle for these abnormal nozzles. As such, when there is only one complementing nozzle to which the pixels of the abnormal nozzle corresponding pixel array in the halftone data KHD can be assigned, the control unit 11 performs a process of assigning all of the pixels of the abnormal nozzle corresponding pixel array to the one complementing nozzle without referring to the nozzle use ratio defining mask 16B.

What is claimed is:

1. A printing apparatus that transports a print substrate in a first direction and moves a printing head which includes a nozzle array in which a plurality of nozzles for discharging a common ink is lined up in the first direction in a second direction which intersects the first direction to perform printing by discharging ink with the nozzle to the print substrate during the movement, the printing apparatus comprising:
    a discharge control unit that assigns halftone data in which discharging or non-discharging of the ink is determined to the nozzle and controls discharging of ink from the nozzle according to the assigned halftone data,
    wherein the printing head moves along the second direction over a band area that has a predetermined width in the first direction of the print substrate for each nozzle group when the nozzle array is divided into a plurality of nozzle groups that is configured by a predetermined number of nozzles lined up in the first direction, and
    the discharge control unit, when an abnormal nozzle having abnormal function of discharging the ink is included in any of the plurality of nozzle groups in a case of discharging the ink to the band area from the nozzle of each of the plurality of nozzle groups by assigning the halftone data to the nozzle of each of the plurality of nozzle groups according to a first ratio that is a preset assignment ratio for each of the plurality of nozzle groups, assigns the halftone data assigned to the abnormal nozzle to the nozzle that is included in other pluralities of nozzle groups which are not the nozzle group including the abnormal nozzle according to a second ratio that is a preset assignment ratio for each of the other pluralities of nozzle groups.

2. The printing apparatus according to claim 1,
    wherein the second ratio is a value obtained by adding a value that is obtained from division of the first ratio of the nozzle group including the abnormal nozzle by the number of the other pluralities of nozzle groups to the first ratio for each of the other pluralities of nozzle groups.

3. The printing apparatus according to claim 1,
    wherein the second ratio is a value obtained by adding a value that is obtained from distribution of the first ratio of the nozzle group including the abnormal nozzle according to the first ratio for each of the other pluralities of nozzle groups to the first ratio for each of the other pluralities of nozzle groups.

4. The printing apparatus according to claim 1,
wherein the printing head includes a first nozzle array as the nozzle array and a second nozzle array that is arranged parallel to the first nozzle array in the second direction,
the first nozzle array is configured by a plurality of nozzles for discharging a black ink,
the second nozzle array is configured by a plurality of nozzle groups that is divided along the first direction in the same manner as division of the plurality of nozzle groups constituting the first nozzle array, and
each of the plurality of nozzle groups constituting the second nozzle array is configured by a plurality of nozzles for discharging a specific color ink.

5. The printing apparatus according to claim 4,
wherein the number of the divided nozzle groups is three.

6. A printing system that transports a print substrate in a first direction and moves a printing head which includes a nozzle array in which a plurality of nozzles for discharging a common ink is lined up in the first direction in a second direction which intersects the first direction to perform printing by discharging ink with the nozzle to the print substrate during the movement, the printing system comprising:
a discharge control unit that assigns halftone data in which discharging or non-discharging of the ink is determined to the nozzle and controls discharging of ink from the nozzle according to the assigned halftone data,
wherein the printing head moves along the second direction over a band area that has a predetermined width in the first direction of the print substrate for each nozzle group when the nozzle array is divided into a plurality of nozzle groups that is configured by a predetermined number of nozzles lined up in the first direction, and
the discharge control unit, when an abnormal nozzle having abnormal function of discharging the ink is included in any of the plurality of nozzle groups in a case of discharging the ink to the band area from the nozzle of each of the plurality of nozzle groups by assigning the halftone data to the nozzle of each of the plurality of nozzle groups according to a first ratio that is a preset assignment ratio for each of the plurality of nozzle groups, assigns the halftone data assigned to the abnormal nozzle to the nozzle that is included in other pluralities of nozzle groups which are not the nozzle group including the abnormal nozzle according to a second ratio that is a preset assignment ratio for each of the other pluralities of nozzle groups.

7. A printing method that transports a print substrate in a first direction and moves a printing head which includes a nozzle array in which a plurality of nozzles for discharging a common ink is lined up in the first direction in a second direction which intersects the first direction to perform printing by discharging ink with the nozzle to the print substrate during the movement, the printing method comprising:
assigning halftone data in which discharging or non-discharging of the ink is determined to the nozzle and controlling discharging of ink from the nozzle according to the assigned halftone data,
wherein the printing head moves along the second direction over a band area that has a predetermined width in the first direction of the print substrate for each nozzle group when the nozzle array is divided into a plurality of nozzle groups that is configured by a predetermined number of nozzles lined up in the first direction, and
in the assigning and controlling, when an abnormal nozzle having abnormal function of discharging the ink is included in any of the plurality of nozzle groups in a case of discharging the ink to the band area from the nozzle of each of the plurality of nozzle groups by assigning the halftone data to the nozzle of each of the plurality of nozzle groups according to a first ratio that is a preset assignment ratio for each of the plurality of nozzle groups, the halftone data assigned to the abnormal nozzle is assigned to the nozzle that is included in other pluralities of nozzle groups which are not the nozzle group including the abnormal nozzle according to a second ratio that is a preset assignment ratio for each of the other pluralities of nozzle groups.

* * * * *